US006831274B2

(12) United States Patent
Smith et al.

(10) Patent No.: US 6,831,274 B2
(45) Date of Patent: Dec. 14, 2004

(54) METHOD AND APPARATUS FOR MULTISPRAY EMITTER FOR MASS SPECTROMETRY

(75) Inventors: Richard D. Smith, Richland, WA (US); Keqi Tang, Richland, WA (US); Yuehe Lin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/091,833

(22) Filed: Mar. 5, 2002

(65) Prior Publication Data

US 2003/0168591 A1 Sep. 11, 2003

(51) Int. Cl.[7] .......................... B01D 59/44; H01J 49/00
(52) U.S. Cl. ........................ 250/288; 250/281; 250/282
(58) Field of Search ................................ 250/281-300, 250/423 R, 424, 423 F

(56) References Cited

U.S. PATENT DOCUMENTS

| | | | | | |
|---|---|---|---|---|---|
| 4,524,121 | A | * | 6/1985 | Gleim et al. | 430/176 |
| 4,898,775 | A | * | 2/1990 | Oka et al. | 428/336 |
| 6,107,628 | A | * | 8/2000 | Smith et al. | 250/292 |
| 2001/0032929 | A1 | * | 10/2001 | Fuhrer et al. | 250/281 |
| 2002/0000517 | A1 | * | 1/2002 | Corso et al. | 250/288 |
| 2002/0185595 | A1 | * | 12/2002 | Smith et al. | 250/288 |
| 2003/0111599 | A1 | * | 6/2003 | Staats | 250/288 |

OTHER PUBLICATIONS

Tang, et al. "Generation of Multiple Electrosprays Using Microfabricated Emitter Arrays for Improved Mass Spectrometric Sensitivity", Analytical Chemistry, Apr. 15, 2000, pp 1658–1663, vol. 73, No. 8, American Chemical Society.*

Nicholas H. Bings, et al., "Microfluidic Devices Connected to Fused–Silica Capillaries with Minimal Dead Volume," Analytical Chemistry, Aug. 1, 1999, pp. 3292–3296, vol. 71, No. 15., American Chemical Society.

J. Fernandez De La Mora, et al., "The Current Emitted by Highly Conducting Taylor Cones," J. Fluid Mechanics, 1994, pp. 155–184, vol. 260. Cambridge University Press.

Frantisek Foret, et al., "Subatmospheric Electrospray Interface for Coupling of Microcolumn Separations with Mass Spectrometry," Electroopphoresis 2000, pp. 1363–1371, vol. 21, Wiley–VCH Verlag GmbH.

Larry Licklider, et al., "A Micromachined Chip–Based Electrospray Source for Mass Spectrometry," Analytical Chemistry, Jan. 15, 2000, pp. 367–375, vol. 72, No. 2, American Chemical Society.

R.S. Ramsey, et al., "Generating Electrospray from Microchip Devices Using Electroosmotic Pumping," Analytical Chemistry, Marcy 15, 1997, pp. 1174–1178, vol. 69, No. 6, American Chemical Society.

Gary A. Schultz, et al., "A Fully Integrated Monolithic Microchip Electrospary Device for Mass Spectrometry," Analytical Chemistry, Sep. 1, 2000, pp. 4058–4063, vol. 72, No. 17, American Chemical Society.

"Improved Ionization Source Utilizing a Multi–Capillary Inlet and Method of Making," Patent Application Ser. No., filed, Group art unit.

(List continued on next page.)

*Primary Examiner*—Nikita Wells
*Assistant Examiner*—Christopher M. Kalivoda
(74) *Attorney, Agent, or Firm*—Douglas E. McKinley, Jr.

(57) ABSTRACT

A method and apparatus that utilizes two or more emitters simultaneously to form an electrospray of a sample that is then directed into a mass spectrometer, thereby increasing the total ion current introduced into an electrospray ionization mass spectrometer, given a liquid flow rate of a sample. The method and apparatus are most conveniently constructed as an array of spray emitters fabricated on a single chip, however, the present invention encompasses any apparatus wherein two or more emitters are simultaneously utilized to form an electrospray of a sample that is then directed into a mass spectrometer.

16 Claims, 7 Drawing Sheets

OTHER PUBLICATIONS

Qifeng Xue, et al., "Multichannel Microchip Electrospray Mass Spectrometry," Analytical Chemistry, Feb. 1, 1997, pp. 426–430, vol. 69, No. 3, American Chemical Society.

B. Zhang, et al., "Microfabricated Devices for Capillary Electrophoresis–Electrospray Mass Spectrometry," Analytical Chemistry, Aug. 1, 1999, pp. 3258–3264, vol. 71, No. 15, American Chemical Society.

Bailin Zhang, et al., "A Microdevice with Integrated Liquid Junction for Facile Peptide and Protein Analysis by Capillary Electrophoresis/Electrospray Mass Spectrometry," Analytical Chemistry, Mar. 1, 2000, pp. 1015–1022, vol. 72, No. 5, American Chemical Society.

Keqi Tang, et al., "Generation of Multiple Electrosprays Using Microfabricated Emitter Arrays for Improved Mass Spectrometric Sensitivity," Analytical Chemistry, Apr. 15, 2000, pp. 1658–1663, vol. 73, No. 8, American Chemical Society.

Gary A. Schultz, et al., "A Fully Integrated Monlithic Microchip Electrospray Device for Mass Spectrometry," Analytical Chemistry, Sep. 1, 2000, pp. 4058–4063, vol. 72, No. 17, American Chemical Society.

Daniel Figeys, et al., "A Microgabricated Device for Rapid Protein Identification by Microelectrospray Ion Trap Mass Spectrometry," Analytical Chemistry, Aug. 15, 1997, pp. 3153–3160, vol. 69, American Chemical Society.

* cited by examiner a)

b)

METHOD AND APPARATUS FOR MULTISPRAY EMITTER FOR MASS SPECTROMETRY

STATEMENT REGARDING FEDERALLY SPONSORED RESEARCH OR DEVELOPMENT

This invention was made with Government support under Contract DE-AC0676RLO1830 awarded by the U.S. Department of Energy. The Government has certain rights in the invention.

CROSS-REFERENCE TO RELATED APPLICATIONS

Not Applicable

BACKGROUND OF THE INVENTION

Various types of micro-fabricated devices have been used in the fields of chemical separations and analysis including capillary electrophoresis, capillary isoelectric focusing and nano column separations (where both flow channel and stationary phase supporting particles can be directly fabricated on chip). As electrospray ionization mass spectrometry (ESI-MS) has become a widely used analytical technique, considerable efforts have been directed at the development of interfaces for chip-based devices with electrospray ionization mass spectrometers. Examples of the current available interfaces include an open channel interface. For example, Zhang, B.; Liu, H.; Karger, B. L.; Foret, F. *Anal. Chem.* 1999, 71, 3258–3264 shows an electrospray with modifications, while Ramsey, R. S.; Ramsey, J. M. *Anal. Chem.* 1997, 69, 1174–1178 and Xue, Q.; Foret, F.; Dunayevskiy, Y. M.; Zavracky, P. M.; Mcgruer, N. E.; Karger, B. L. *Anal. Chem.* 1997, 69, 426–430 show an electrospray without modifications, where an electrospray was generated directly from the open channel terminus, attaching a fused-silica capillary to the channel end where the joint was either sealed, as shown in Licklider, L.; Wang, X.; Desai, A.; Tai, Y.; Lee, T. D. *Anal. Chem.* 2000, 72, 367–375, Figeys, D.; Ning, Y.; Aebersold, R. *Anal Chem.* 1997, 69, 3153–3160, and Bings, N. H.; Wang, C.; Skinner, C. D.; Colyer, C. L.; Thibault, P.; Harrison, D. J. *Anal. Chem.* 1999, 71, 3292–3296, or made by a liquid junction, as shown in Forest, F.; Zhou, H.; Gangl, E.; Karger, B. L. *Electrophoresis* 2000, 21, 1363–1371 and Zhang, B.; Foret, F.; Karger, B. L. *Anal. Chem.* 2000, 72, 1015–1022. These, and all other references described herein, including without limitation patents, technical papers, or otherwise, are incorporated in their entirety by this reference.

Despite these advances, the reliability and/or ease of fabrication of these interfaces still presents significant problems for their broad applicability. Ideally the interface of a microfabricated device with a mass spectrometer should integrate the electrospray emitter with the device to form a complete separation and electrospray unit that can be readily replicated. As described in the paper "A Fully Integrated Monolithic Mircrochip Electrospray Device for Mass Spectrometry, *Analytical Chemistry*, Vol. 72, No. 17, Sep. 1, 2000, 4058–4063, Schultz and Corso recently described a concept for a microfabricated electrospray emitter array where photolithographic patterning and plasma etching were used to fabricate an array of electrospray emitters on a silicon wafer. The technique offered a potential solution to the problem of system integration for high-throughput applications where each spray nozzle can be connected to a different sample well and operated sequentially. A limitation associated with the use of silicon technology for electrospray emitter fabrication, as reported by Schultz and Corso, is that each spray nozzle array can only be used reliably for a little more than 1 h. Also, each nozzle in the array described by Schultz and Corso is designed to be interfaced with both the analyte source and the entrance to the mass spectrometer sequentially. As such, the device does not utilize the array to impact the analyte throughput, or the resulting signal strength, in the mass spectrometer. This is an important drawback, as generating a higher total ion current, given a liquid flow rate, is an important objective for enhancing the sensitivity of mass spectrometers.

Thus, there exists a need for improved interfaces between chip based separation and analysis devices with electrospray ionization mass spectrometers, and a particular need for improved devices which enhance the total ion current given a liquid flow rate.

BRIEF SUMMARY OF THE INVENTION

Accordingly, it is an object of the present invention to provide a method and apparatus that increases the total ion current introduced into an electrospray ionization mass spectrometer, given a liquid flow rate of a sample. This objective is accomplished by use of the surprising discovery that an array of spray emitters directed into a mass spectrometer produce a greater total ion current than a single emitter having the same liquid flow rate. Due to the small size of the emitters commonly deployed in mass spectrometry, the present invention is most conveniently constructed as an array of spray emitters fabricated on a single chip, however, the present invention should be understood to encompass any apparatus wherein two or more emitters are simultaneously utilized to form an electrospray of a sample that is then directed into a mass spectrometer.

When fabricated as a single chip, the array of spray emitters is interfaced with a liquid sample source, including but not limited to liquid separation devices, on one side of the chip. Suitable liquid separation devices include, but are not limited to capillary electrophoresis devices, capillary isoelectric focusing devices, and nano column separation devices. Typically, while not meant to be limiting, the liquid sample is interfaced with the chip by providing a single reservoir for the sample that is common to all of the spray emitters. However, in certain applications, it may be preferred to provide a separate reservoir for each emitter, or a plurality of reservoirs common, each feeding a portion of the emitters.

The other side of the chip is interfaced with the entrance to a mass spectrometer. Liquid samples are passed through the array, whereupon the samples are formed into an electrospray at each spray emitter within the array. The total electrospray formed at all of the spray emitters are then simultaneously introduced into a mass spectrometer. Preferably, while not meant to be limiting, the total electrospray is introduced into the mass spectrometer through a multi-capillary inlet, as more fully described in U.S. patent application Ser. No. 09/860,727 filed May 18, 2001, entitled "Improved Ionization Source Utilizing a Multi-Capillary Inlet and Method of Operation" by Smith et al. While not meant to be limiting, those skilled in the art will better understand the fabrication, operation, and advantages offered by the present invention, including its theory of operation, and the surprising increase in the total ion current generated by the device, through reference to the detailed description which follows.

BRIEF DESCRIPTION OF THE SEVERAL VIEWS OF THE DRAWING

FIG. 1(*a*) shows an array of nine electrospray emitters arranged in a 3×3 configuration; FIG. 1(*b*) shows the dimensions for each spray emitter in the array.

FIG. 2(*a*) shows the experimental setup for the characterization of multielectrosprays generated from microfabricated emitter array and FIG. 2(*b*) shows the experimental setup for the mass spectrometric evaluation of the microfabricated electrospray array.

DETAILED DESCRIPTION OF THE INVENTION

Figure 1:
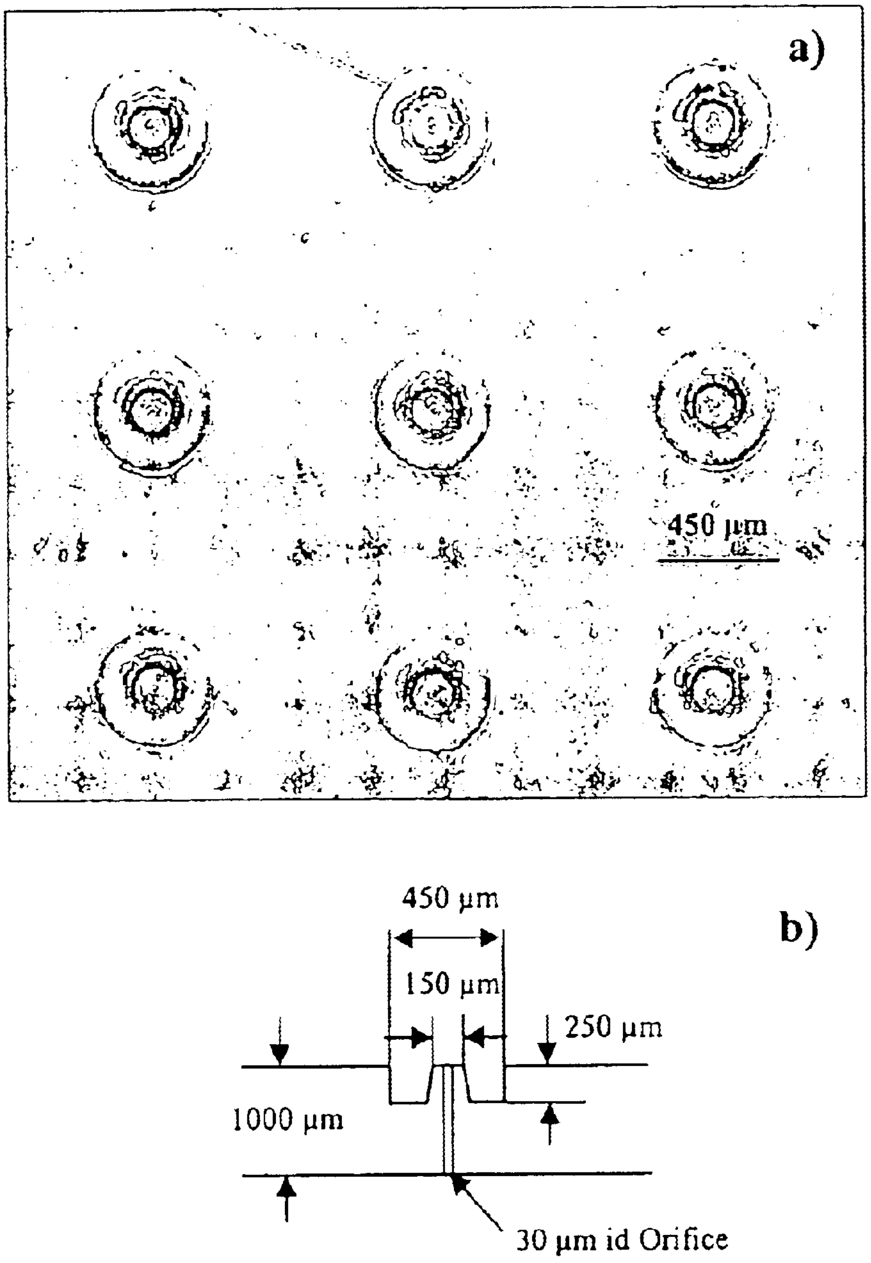
FIG. 1. is a schematic of an exemplary electrospray emitter array microfabricated to demonstrate a preferred embodiment of the present invention.

A prototype of the present invention was fabricated on a polycarbonate substrate using a laser etching technique, and a series of experiments were conducted with the prototype, to demonstrate the use and advantages of the present invention.

While the prototype was fabricated using a polycarbonate substrate and a laser etching technique, the present invention should in no way be viewed as limited to this embodiment. Accordingly, materials and techniques commonly used for the fabrication of microscale structures should be considered as within the scope of the present invention. Exemplary techniques would therefore include, but not limited to, laser etching, photolithographic patterning, wet chemical etching, laser ablation, plasma etching, casting, injection molding, and hot and cold stamping (embossing). Specific materials would include, but not be limited to, polycarbonate, plastic, glass, and silicon, as those materials are commonly used in the forgoing fabrication techniques. The products from these microfabrication techniques typically incorporate channels having micrometer range dimensions, and may further include valves for flow control and reservoirs for liquid storage. The use of such features also should be considered as within the contemplation of the present invention. Multiple layers of devices containing microfeatures can further be bonded together to form 3-D structures, and structures formed in this manner may be also be used to practice the present invention. While liquid flow in these structures is most often driven by the electroosmotic force induced by the electric field at the channel-liquid interface, the present invention should be understood to also include any motive force that directs liquid flow through an array of emitters, for example, pressure (e.g., using a syringe pump).

The prototype spray emitter arrays of the present invention were fabricated from a 1-mm-thick polycarbonate sheet using a laser etching method (Lumonics 848 excimer laser operating at 248 nm). FIG. 1*a* shows a prototype where an array of nine electro-spray emitters were fabricated and arranged in a three by three configuration. The emitters were positioned 1.1 mm apart, and the spray emitter tip was ~150 $\mu$m in diameter with a center channel 30 $\mu$m in diameter. The center through holes were first machined by laser ablation at a high demagnification factor (~35×) using a small circular mask. The 450-$\mu$m-diameter and 250-$\mu$m-deep well around the each spray emitter was machined by reducing the laser beam demagnification factor to ~5×. Because of the inherent taper of laser etching at low demagnification factors, the emitter tips produced in this way typically had a conical cross section, as illustrated in FIG. 1*b*.

To enhance the hydrophobicity of the polycarbonate surface, the surface of the microchip was treated with a $CF_4$ rf plasma, or coated with a Teflon thin-film by sputtering coating technology after the spray emitter array was fabricated. The increased hydrophobicity of the treated polycarbonate surface prevented the sample solution from spreading over the edge of the emitter well and afforded stable electrosprays from each emitter.

Figure 2:
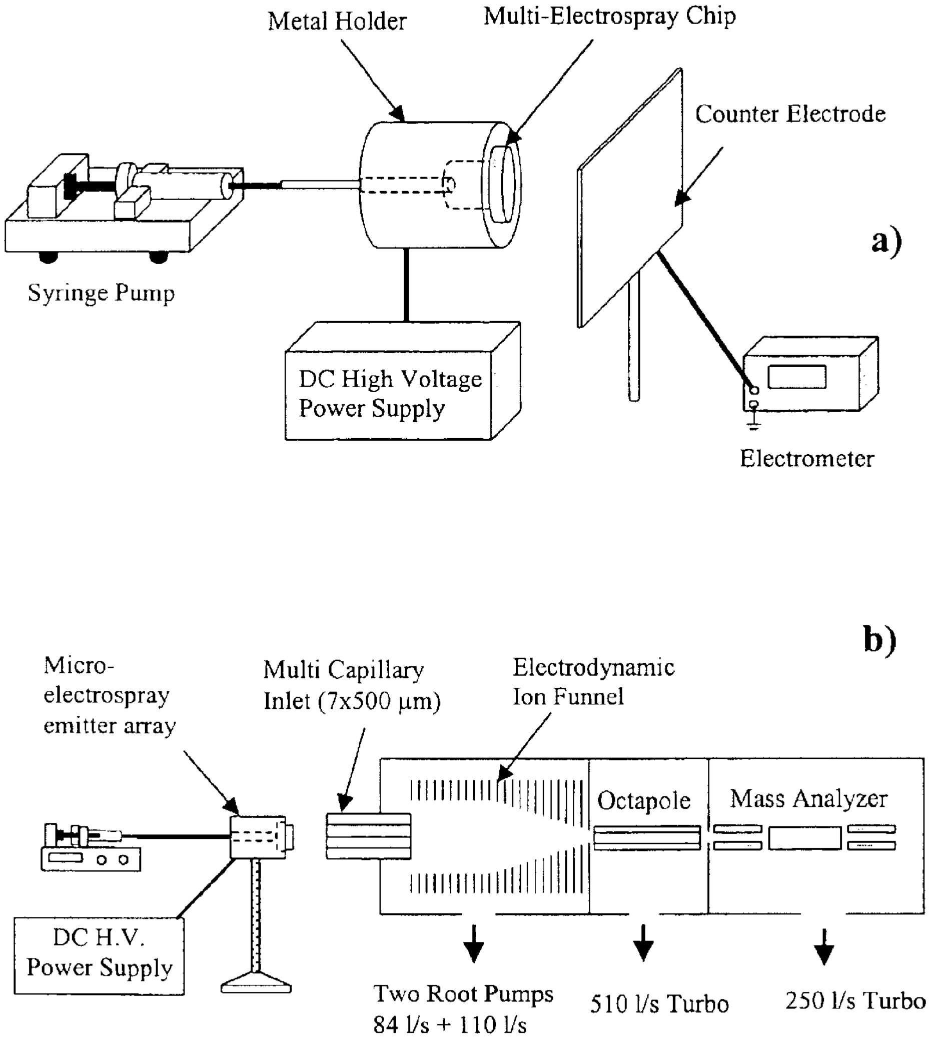
FIG. 2. is a schematic of the experimental setups used to demonstrate a preferred embodiment of the present invention.

To demonstrate multiple stable electrosprays using these prototype microfabricated emitter arrays, the arrays were mounted to a stainless steel block using the configuration shown in FIG. 2*a*. The void behind the chip served as a liquid reservoir allowing a simultaneous supply of sample solution to each emitter. A syringe pump connected to the block through a standard LC fitting was used for sample infusion. The block assembly was mounted on an optical stand. A high-voltage dc power supply, connected to the metal block, was used to create the desired voltage difference relative to a metal counter electrode plate positioned ~5 mm away. An electrometer was connected to the counter electrode for measurement of total electric current of multielectrosprays, which are refered to herein as the total ion current. Upon the establishment of stable multielectrosprays, further characterization of these "chip-based" electrosprays was also performed using this configuration. The solvent mixture of 50:50 methanol/water+1% acetic acid was used for all electrospray characterization experiments.

A stereo zoom microscope was used to monitor the electrospray in all the experiments and confirm spray stability. After the spray characterization, the microfabricated emitter array was further evaluated for its performance in electrospray ionization mass spectrometry, as shown in FIG. 2*b*. A modified triple quadruple mass spectrometer (Sciex API 3000) was used in which the standard curtain gas-skimmer interface of the API 3000 was replaced with a heated multicapillary (7_500 ím) inlet and an electrodynamic ion funnel interface for improved spray desolvation and ion transmission efficiency, as described in U.S. patent application Ser. No. 09/860,727 filed May 18, 2001, entitled "Improved Ionization Source Utilizing a Multi-Capillary Inlet and Method of Operation" by Smith et al. and U.S. Pat. No. 6,107,628 entitled "Method and apparatus for directing ions and other charged particles generated at near atmospheric pressures into a region under vacuum" also issued to Smith et al.

As shown in FIG. 2*b*, the electrodynamic Ion Funnel was operated in a vacuum produced by two root pumps, operating at 84 l/s and 110 l/s, respectively. The octapole was operated in a vacuum produced by a Turbo pump operating at 510 l/s. The Mass Analyzer was operated in a vacuum produced by a Turbo pump operating at 250 l/s. As will be apparent to those having skill in the art, the each of these pumps will generally create a successively larger vacuum as ions progress from the entrance of the instrument at the Multicapillary Inlet towards the Mass Analyzer.

The spray emitter array was positioned ~5 mm away from the multicapillary inlet. The high-voltage dc power supply and syringe pump described in FIG. 2*a* again provided electro-spray voltage and controlled liquid flow rate. Solutions of reserpine were used for evaluation of performance. The temperature of the heated multicapillary inlet was fixed at 200° C. A dc bias of 250 V was applied to the multicapillary block. The rf frequency and the amplitude applied to the ion funnel were 0.9 MHz and 130 Vp-p, respectively. The dc biases on the first ion funnel plate (25.4-mm i.d.) and the last ion funnel plate (2.3-mm i.d.) were 250 and 30 V, respectively, which resulted in an axial dc field of ~20 V/cm in the ion funnel. The mass spectrometer was operated in the positive ESI mode, and the selected ion monitoring (SIM) mode was used for the evaluation of sensitivity.

Figure 3:
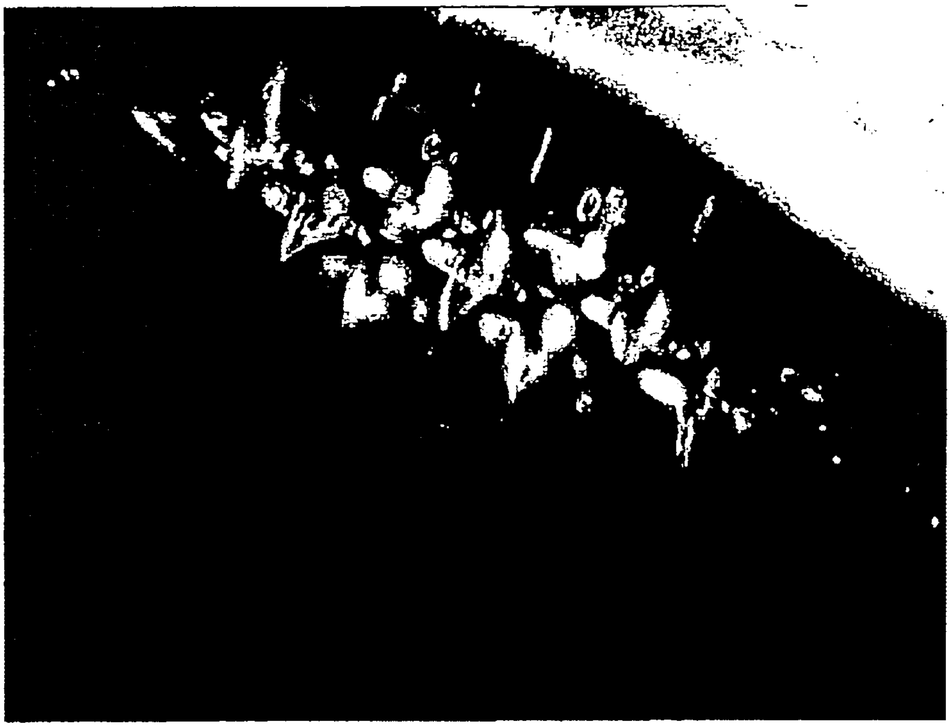
FIG. 3. is a photograph of nine stable electrosprays generated from the nine-spray emitter array.

FIG. 3 shows a photo of nine electrosprays generated from the nine-emitter array using the arrangement shown in FIG. 1. The emitter array was operated at a total infusion flow rate of 3 μL/min using a solvent mixture of 50:50 methanol/water+1% acetic acid. A stable electrospray was established from each emitter without the assistance of any nebulization gas, as demonstrated by the nine stable Taylor cones evident in FIG. 3. Interestingly, each electrospray showed a much smaller spray dispersion angle compared to that from a conventional single-capillary-plate configuration, which is ascribed to the significantly less divergent electric field between the electrospray emitter array and the counter plane electrode. The result is better focused electrosprays although a higher than typical voltage (~7 kV for the electrode separation of ~5 mm) is required to establish the stable electrosprays.

Figure 4:
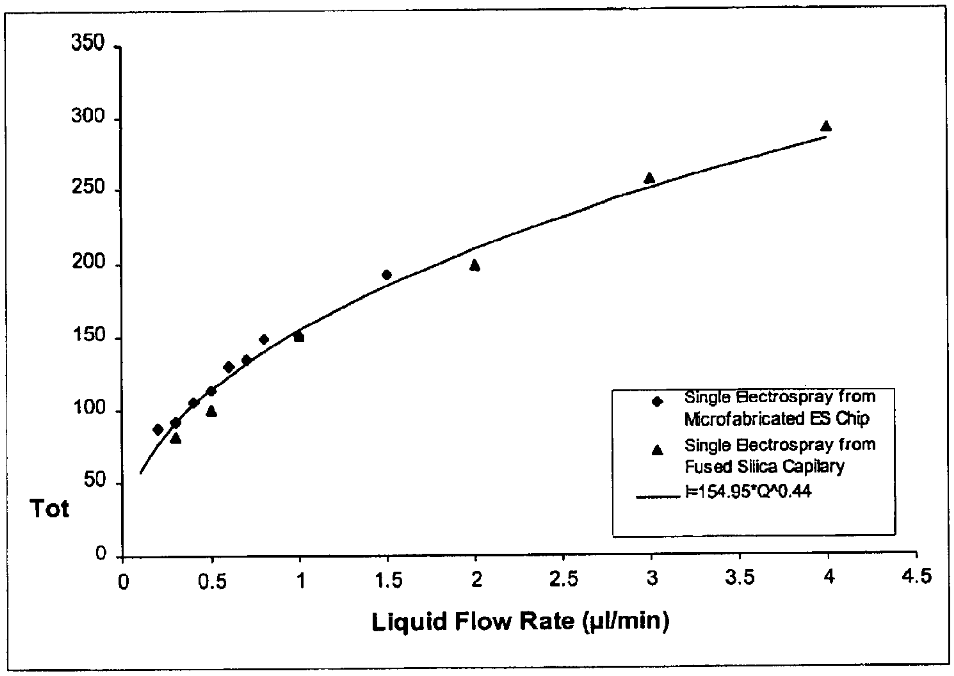
FIG. 4. is a graph showing the total spray ion current vs liquid flow rate for the single electrospray generated from a microfabricated single-spray emitter of the present invention and a fused-silica capillary for comparison using 50:50 methanol/water +1% acetic acid.

After stable electrosprays were established with the emitter array, the total spray ion current was measured at different liquid flow rates. To establish a baseline for all the comparisons, the total ion currents for single electrospray generated from both a conventional fused-silica capillary (100-ím i.d. and 200-ím o.d. with the tip pulled down to 50 μm) and a microfabricated single-spray emitter were measured at different liquid flow rates. FIG. 4 shows the total ion currents measured at different flow rates.

The fact that the two sets of data in FIG. 4 correlate well indicates that the electrosprays had quite similar characteristics. It is also interesting to note from FIG. 4 that the total electrospray current fits a 0.44 power of liquid flow rate, very close to the theoretical prediction of de la Mora and Loscertales as described in De la Mora, J. F.; Loscertales, I. G. *J. Fluid Mech.* 1994, 260, 155–184. Their analysis concluded that, for electrosprays of highly conductive liquids, the dependence of the total electrospray current on the liquid flow rate could be formulated as, $$I_s = f(\epsilon)(QKy/\epsilon)^{1/2} \quad (1)$$

where $I_s$ is the total spray current from single electrospray, K is the electric conductivity of the liquid, y is the surface tension of the liquid, ϵ is the dielectric constant of the liquid, and Q is the liquid flow rate. Equation 1 was derived through a detailed dimensional analysis of the charge transport process through the Taylor cone and was verified by the authors experimentally using variety of liquid mixtures. Good agreement between the experimental results shown in FIG. 4 and equation 1 supported the optical evaluation indicating that stable cone-jet mode electrosprays were obtained in the present studies.

Figure 5:
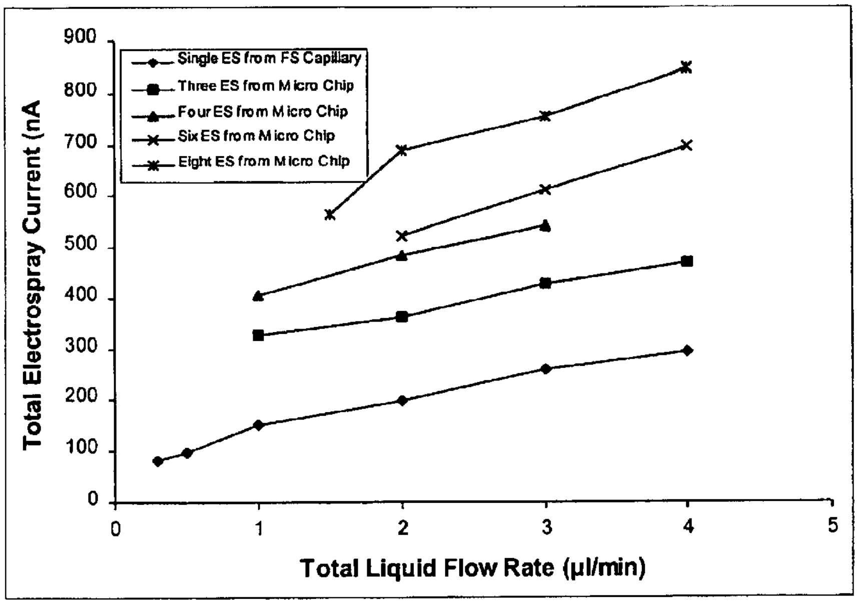
FIGS. 5(*a*) and (*b*) are graphs showing the total spray ion current vs total liquid flow rate for (a) multielectrosprays generated from the microfabricated emitter arrays and (b) normalized by the number of electrosprays using 50:50 methanol/water +1% acetic acid.
Figure 5:
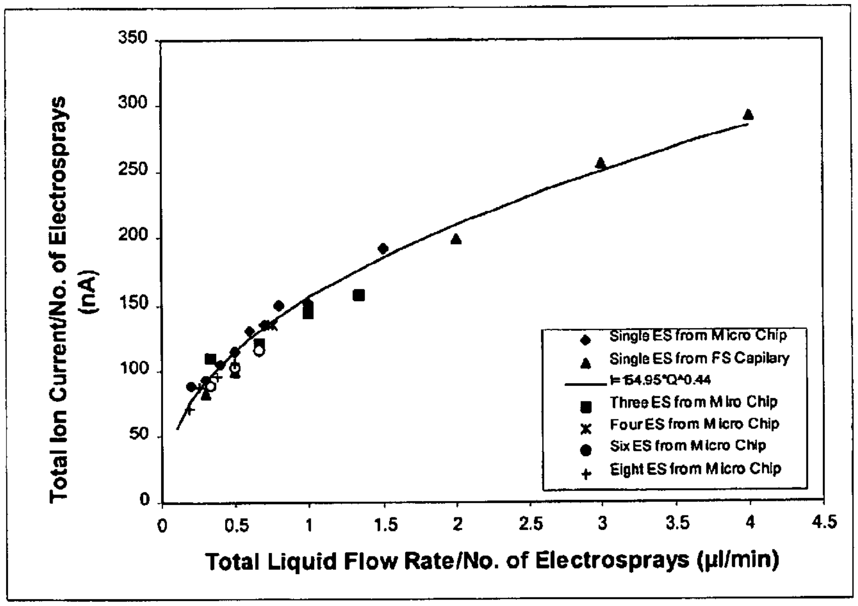

Next, multielectrosprays were generated from the microfabricated chip using different numbers of emitters. The total ion currents of the multielectrosprays were measured at different liquid flow rates. The experimental data shown in FIG. 5*a* clearly indicated that at each total liquid flow rate the total ion current increased as the number of the electrosprays increased. The results in FIG. 5*a* also show that the total ion current from eight electrosprays was ~3 times higher than from a single electrospray at the same total liquid flow rate. The reason for this is evident from equation 1. If one assumes that each electrospray in the array behaves identically to a single electrospray, then from eq 1, $$I^* = f(\epsilon)(Q^*Ky/\epsilon)^{1/2} \quad (2)$$

where I* and Q* are the ion current carried by each electrospray and the liquid flow rate supplied to each emitter in the array, respectively. It is apparent that Q* is smaller than the total liquid flow rate Q supplied to the emitter array. The total ion current of the multielectrosprays then becomes, $$I_{Total} = \sum_{i=1}^{n} r_i$$

where n is the total number of electrosprays generated from the emitter array.

If we further assume that the liquid flow is distributed uniformly into every emitter, i.e., Q*) Q/n, each electrospray in the array will then carry the same ion current. Equation 3 becomes $$I_{Total} = nI^* \quad (4)$$

Figure 6:
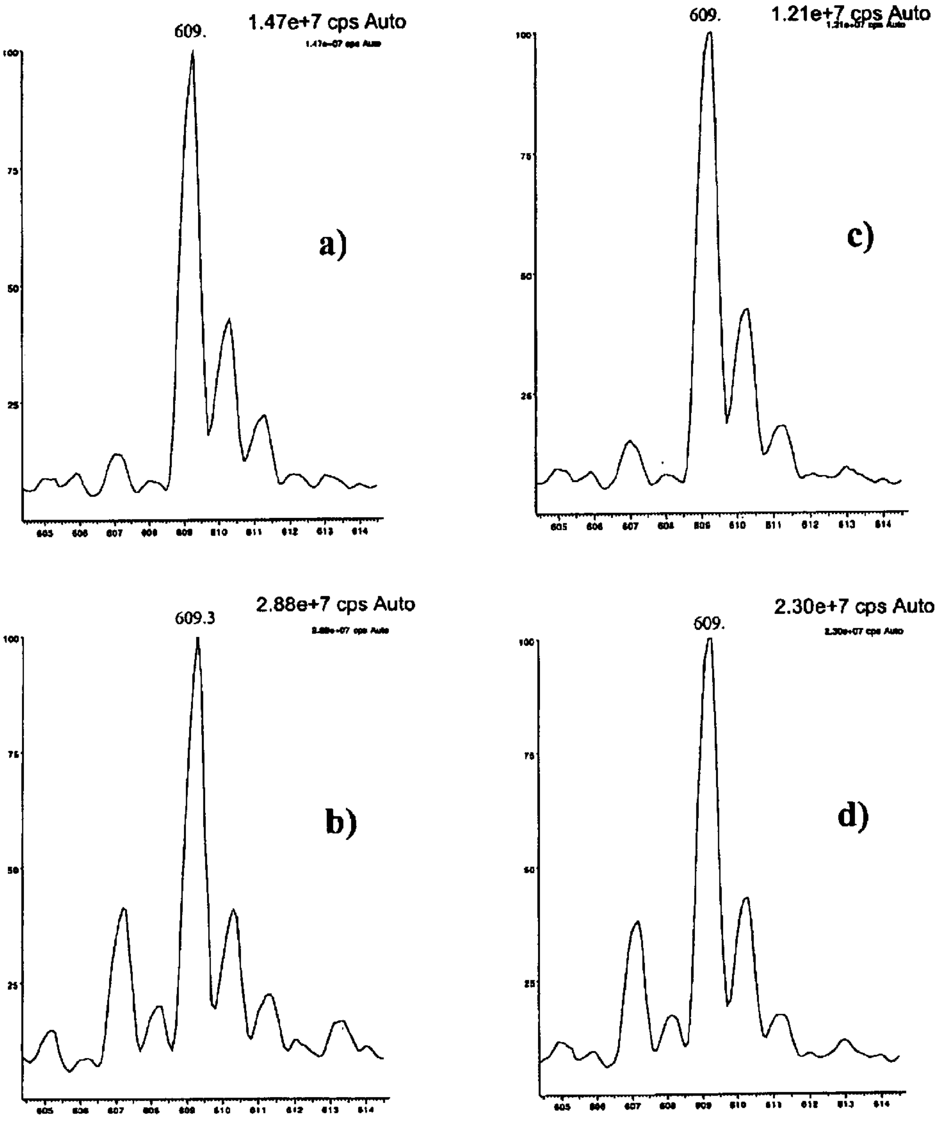
FIGS. 6(*a*)(*b*)(*c*) and (*d*) are mass spectrometric sensitivity comparisons between (a) single electrospray from fused-silica capillary and (b) three electro-sprays from microfabricated emitter array at flow rate of 1 íL/min, and between (c) single electrospray from fused-silica capillary and (d) four electrosprays from microfabricated emitter array at flow rate of 4 íL/min with 50 pg/íL reserpine in 50:50 methanol/water+1% acetic acid.

Substituting eq 2 into eq 4, we have $$I_{Total} = \sqrt{n} f(\epsilon)(Q^*Ky/\epsilon)^{1/2} = \sqrt{n} I_s \quad (5)$$

total ion current from the multielectrosprays, compared to the ion current from single electrospray at a given total flow rate, is proportional to the square root of the number of electrosprays. To verify equation 5, the experimental data shown in FIG. 5*a* were normalized by the number of electrosprays in FIG. 5*b*. All the experimental data collapsed to provide a good fit by a single curve. These results support the assumptions used in the derivation of equation 5, i.e., that each electrospray carried approximately the same ion current in the multielectrospray and the liquid flow was distributed approximately equally to each spray emitter. Because of the higher ion current produced by the multielectrosprays, the potential of using multielectrosprays as an ionization source to enhance the sensitivity or dynamic range of mass spectrometry was further evaluated using the arrangement shown in FIG. 2*b*. Sensitivity comparisons between a single electrospray using a fused-silica capillary and multielectrosprays from a microfabricated emitter array were performed using a solution of 50 pg/íL reserpine in 50:50 methanol/water+1% acetic acid introduced at different infusion flow rates. While all the MS parameter settings were held constant, the single electrospray and multielectrosprays sources were interchanged. FIGS. 6*a* and *b* shows the SIM mass spectra obtained for single electrospray and three electrosprays for a total sample infusion rate of 1 íL/min. A factor of 2 sensitivity enhancements was achieved using multielectrosprays as the ion source. Similar sensitivity enhancement was also achieved for four electrosprays at a sample flow rate of 2 íL/min compared to the single electrospray, as shown in FIGS. 6*c* and *d*. The experimental results are summarized in FIG. 7 where the number of electrosprays was varied from two to nine at liquid flow rates ranging from 1 to 8 íL/min. For comparison, the results from a single electrospray using a fused-silica capillary are also plotted in FIG. 7. A factor of 2–3 sensitivity enhancement was achieved using multielectrosprays at all the sample flow rates evaluated. It was also noted experimentally that stable multielectrospray could be generated at higher liquid flow rates compared to the fused-silica capillary single electrospray.

Figure 7:
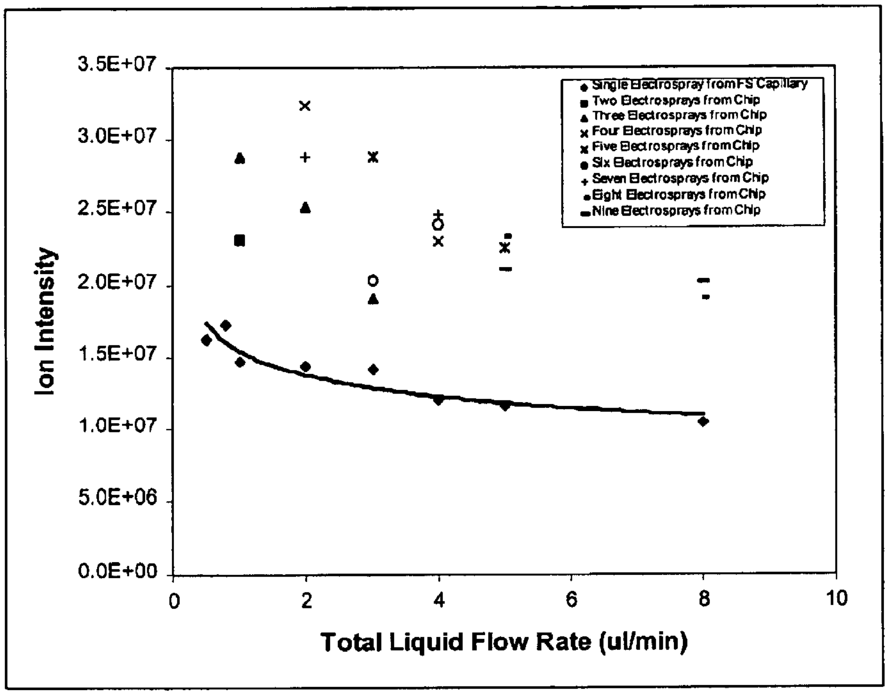
FIG. 7. is a graph showing the ESI-MS sensitivity improvement at different total liquid flow rates for a solution of 50 pg/íL reserpine in 50:50 methanol/water+1% acetic acid multielectrosprays as the ionization source.

The sensitivity enhancements shown in FIG. 7 are consistent with the theoretical prediction of equation 5 if one assumes that the total electrospray current is the major parameter determining the ion intensity of the mass spectra.

It is particularly important to understand that the multi-emitter ESI source can provide an even greater increase in dynamic range than suggested above. In many (or most) current ESI-MS applications (e.g., using liquid chromatography), much larger sample sizes or liquid flow rates are available than are of present practical utility with ESI. Thus, if all available ESI emitters were to be operated at a flow rate for maximum ion current production, the actual gain in total current would be approximately proportional to the number of emitters. For example, from FIG. 5*a*, the eight-emitter array at 4 íL/min provides an ion current of 0.85 íA; that is more than 8 times greater than the ion current (~0.1 íA) generated from a single capillary at 0.5 íL/min. Thus, a set of eight emitters each operating at 4 íL/min can potentially provide a current of more than 2 íA, much greater than that current achievable by any conventional ESI source used for mass spectrometry.

Closure

While a preferred embodiment of the present invention has been shown and described, it will be apparent to those skilled in the art that many changes and modifications may be made without departing from the invention in its broader aspects. For example, while a preferred embodiment utilizing a 3×3 array arranged in a square pattern has been shown and described, it will be apparent to those having skill in the art that any arrangement of two or more emitters, which may further be arranged in a wide variety of geometrical arrangements, are possible, and will produce the enhanced sensitivity sought by the present invention. The appended claims are therefore intended to cover all such changes and modifications as fall within the true spirit and scope of the invention.

We claim:

1. A method for increasing the total ion current produced from a liquid sample introduced into a mass spectrometer comprising the steps of:

a. providing an array of spray emitters, b. providing said liquid sample in at least one reservoir formed on one side of said array, c. interfacing the opposite side of said array with the entrance to a mass spectrometer, d. forming an electrospray of said liquid sample at each opposite side of each emitter in said array, e. directing said electrosprays into said entrance of said mass spectrometer, f. providing an ion funnel within the interior of the mass spectrometer and adjacent to the entrance to the mass spectrometer at the opposite side as said array of spray emitters.

g. further directing the electrosprays through said ion funnel, h. and further comprising the step of enhancing the hydrophobicity of the array.

2. The method of claim 1 wherein said entrance to said mass spectrometer is provided as a multi-capillary inlet.

3. The method of claim 1 wherein said array of spray emitters is provided as fabricated on a single chip.

4. The method of claim 3 wherein said chip is fabricated by a method selected from the group consisting of laser etching, photolithographic patterning, wet chemical etching, laser ablation, plasma etching, casting, injection molding, and hot and cold stamping (embossing).

5. The method of claim 3 wherein said chip is fabricated from materials selected from the group consisting of polycarbonate, polyamide, polymethylmethacrylate, polyoxymethylene, cycloolefin copolymer, polyethylene, polypropylene, polystyrene, plastic, glass, silicon, and combinations thereof.

6. The method of claim 1 wherein said reservoirs are interfaced with a liquid separation device.

7. The method of claim 6 wherein said liquid separation devices are selected from the group consisting of capillary electrophoresis devices, capillary isoelectric focusing devices, micro liquid chromatography, and nano column separation devices.

8. The method of claim 1 wherein the step of enhancing the hydrophobicity of the array occurs by treating the surface with a $CF_4$ rf plasma.

9. A apparatus for increasing the total ion current produced from a liquid sample introduced into a mass spectrometer comprising:

a. an array of spray emitters, b. at least one reservoir formed on one side of said array, and c. a mass spectrometer having an entrance, and having an ion funnel within the interior of the mass spectrometer and adjacent to the entrance to the mass spectrometer at the opposite side as said array of spray emitters, wherein a liquid sample introduced into at least one of said reservoirs is formed into an electrospray at the opposite side of said array in at least two of said emitters, and said electrospray is then directed into said entrance of said mass spectrometer, and is further directed through said ion funnel, d. wherein the hydrophobicity of the array is enhanced.

10. The apparatus of claim 9 wherein said entrance to said mass spectrometer is a multi-capillary inlet.

11. The apparatus of claim 9 wherein said array of spray emitters is fabricated on a single chip.

12. The apparatus of claim 11 wherein said chip is fabricated by a method selected from the group consisting of laser etching, photolithographic patterning, wet chemical etching, laser ablation, plasma etching, casting, injection molding, and hot and cold stamping (embossing).

13. The apparatus of claim 12 wherein said chip is fabricated from materials selected from the group consisting of polycarbonate, plastic, glass, silicon, and combinations thereof.

14. The apparatus of claim 9 further comprising a liquid separation device wherein said reservoirs are interfaced with a liquid separation device.

15. The apparatus of claim 14 wherein said liquid separation device is selected from the group consisting of a capillary electrophoresis device, a capillary isoelectric focusing device, and a nano column separation device.

16. The apparatus of claim 9 wherein the hydrophobicity of the array is enhanced with a $CF_4$ rf plasma.

* * * * *